(12) United States Patent
Sambhy et al.

(10) Patent No.: US 9,623,442 B2
(45) Date of Patent: *Apr. 18, 2017

(54) PROCESS FOR THERMALLY STABLE OLEOPHOBIC LOW ADHESION COATING FOR INKJET PRINTHEAD FRONT FACE

(75) Inventors: Varun Sambhy, Penfield, NY (US); Kock-Yee Law, Penfield, NY (US); Hong Zhao, Webster, NY (US); Darren Smith, Rochester, NY (US)

(73) Assignee: XEROX CORPORATION, Norwalk, CT (US)

( * ) Notice: Subject to any disclaimer, the term of this patent is extended or adjusted under 35 U.S.C. 154(b) by 765 days.

This patent is subject to a terminal disclaimer.

(21) Appl. No.: 13/451,391

(22) Filed: Apr. 19, 2012

(65) Prior Publication Data

US 2013/0280431 A1 Oct. 24, 2013
US 2015/0315395 A9 Nov. 5, 2015

Related U.S. Application Data

(63) Continuation-in-part of application No. 13/275,255, filed on Oct. 17, 2011, now Pat. No. 9,073,323.

(51) Int. Cl.

| | |
|---|---|
| *B05D 5/08* | (2006.01) |
| *B41J 2/165* | (2006.01) |
| *B41J 2/14* | (2006.01) |
| *C08G 18/50* | (2006.01) |
| *C08G 18/79* | (2006.01) |
| *C09D 5/00* | (2006.01) |
| *C09D 11/30* | (2014.01) |
| *C09D 175/04* | (2006.01) |
| *C09D 183/10* | (2006.01) |

(52) U.S. Cl.
CPC ............ *B05D 5/083* (2013.01); *B41J 2/1433* (2013.01); *B41J 2/165* (2013.01); *C08G 18/5015* (2013.01); *C08G 18/792* (2013.01); *C09D 5/00* (2013.01); *C09D 11/30* (2013.01); *C09D 175/04* (2013.01); *C09D 183/10* (2013.01)

(58) Field of Classification Search
CPC .......... B41J 2/165; B41J 2/1433; C09D 5/00; C09D 175/04; C09D 11/30; C09D 183/10; C08G 18/5015; C08G 18/792; B05D 5/083
USPC ................. 524/315, 380, 462, 590; 347/45; 427/379
See application file for complete search history.

(56) References Cited

U.S. PATENT DOCUMENTS

| | | | | |
|---|---|---|---|---|
| 3,356,650 | A * | 12/1967 | McElroy | C08G 18/28 528/76 |
| 8,544,987 | B2 * | 10/2013 | Sambhy et al. | 347/45 |
| 8,969,487 | B2 * | 3/2015 | Sambhy | B41J 2/1606 106/287.23 |
| 9,073,323 | B2 * | 7/2015 | Sambhy | C08G 18/5015 |
| 2011/0122195 | A1 | 5/2011 | Kovacs et al. | |
| 2012/0044298 | A1 | 2/2012 | Sambhy et al. | |

* cited by examiner

*Primary Examiner* — Patrick Niland
(74) *Attorney, Agent, or Firm* — Marger Johnson

(57) ABSTRACT

A coating for an ink jet printhead front face, wherein the coating comprises an oleophobic low adhesion coating having high thermal stability as indicated by less than about 15 percent weight loss when heated to up to 300° C., and wherein a drop of ultra-violet (UV) gel ink or a drop of solid ink exhibits a contact angle of greater than about 50° and sliding angle of less than about 30° with a surface of the coating, wherein the coating maintains the contact angle and sliding angle after the coating has been exposed to a temperature of at least 260° C. for at least 30 minutes.

6 Claims, 2 Drawing Sheets

PROCESS FOR THERMALLY STABLE OLEOPHOBIC LOW ADHESION COATING FOR INKJET PRINTHEAD FRONT FACE

CROSS-REFERENCE TO RELATED APPLICATIONS

Copending Application U.S. Ser. No. 12/625,442, filed Nov. 24, 2009, entitled "COATING FOR AN INK JET PRINTHEAD FRONT FACE,"

Copending Application U.S. Ser. No. 12/860,660, filed Aug. 20, 2010, entitled "THERMALLY STABLE OLEOPHOBIC LOW ADHESION COATING FOR INKJET PRINTHEAD FRONT FACE,"

This application is a continuation-in-part of copending Application U.S. Ser. No. 13/275,255, filed Oct. 17, 2011, entitled "IMPROVED PROCESS FOR THERMALLY STABLE OLEOPHOBIC LOW ADHESION COATING FOR INKJET PRINTHEAD FRONT FACE,"

Copending Application U.S. Ser. No. 13/275,245, filed simultaneously with this application, entitled, "SELF CLEANING PRINTHEAD," the disclosure of each is incorporated herein by reference in their entirety.

BACKGROUND

In many solid ink printheads, the nozzle plate and jet stacks typically consist of stainless steel plates. The nozzle plate has an array of small holes, or nozzles, also sometimes referred to as jets, through which the ink exits the jet stack. Stainless steel nozzle plates and other plates in the jet stack are being replaced with flexible, polymer layers such as polyimide. In some instances, the polyimide film receives an anti-wetting coating, is bonded to a stainless steel aperture plate, and then a laser ablates the array of apertures into the polyimide film.

Drooling nozzles, wetting and adhesion of ink on the printhead front face lead to missing and misdirectional jetting along with poor IQ. Drooling nozzles weep ink when the internal pressure of the printhead exceeds a particular pressure, typically measured in inches or water. The higher pressure the nozzles can maintain without weeping leads to higher jetting latitude and improved performance. Wetting occurs when the front face of the printhead remains wet after printing. This ink that remains on the printhead can block the nozzles resulting in missing nozzles and misdirectional printing. FIG. 1 shows a photograph of such a contaminated printhead.

Currently, one approach to overcome these issues is to use an active cleaning blade system. The system purges ink from the printhead and a wiper blade then wipes the ink off the front face. Ink purges typically occur after the system detects missing jets and after a power-down when the ink has frozen or solidified, shrunk and drawn air into the system. The ink purge expels contamination, trapped air and clears the nozzles, and then the wipers clean off the front face. To meet future EnergyStar® requirements, the printers will shut-down nightly during which the printheads, reservoirs, and umbilicals do not receive heat. With an expected printhead lifetime of 6 years, daily purges will require roughly 2000 purge and wipe cycles. This increase in wipes means that any anti-wetting coating will have to survive and maintain their beneficial properties for over 2000 cycles.

The anti-wetting coating must have high contact angle to maintain adequate drool pressure and low slide angle to maintain the easy clean/self clean feature. This will lead to printhead cartridges with low or no maintenance, high engine reliability and low run cost. The stack manufacturing process generally involves high temperatures and pressures, so the coating must maintain these properties under these conditions, typically 290° C. and 350 psi for approximately 30 minutes. Generally low-adhesion coatings having low slide angles have shown to slide off the printhead front face cleanly under gravity.

Oleophobic, low adhesion surface coatings have provided significant performance improvements. However, even with such a coating, printhead front face will undergo several wipe cycles. Current coatings, while having good thermal and ink stabilities, may suffer from lower mechanical robustness than may be desirable.

Another issue may arise with these coatings. After high temperature curing processes used in some of the above approaches, the coating may have a thin layer of oil on its surface. While the oil does not seem to detrimentally affect the surface properties and printhead performance, it may cause shelf life issues and present problems in packaging and handling. One could clean off the oil layer, but that increases manufacturing complexity and costs.

DETAILED DESCRIPTION OF THE EMBODIMENTS

Figure 1:
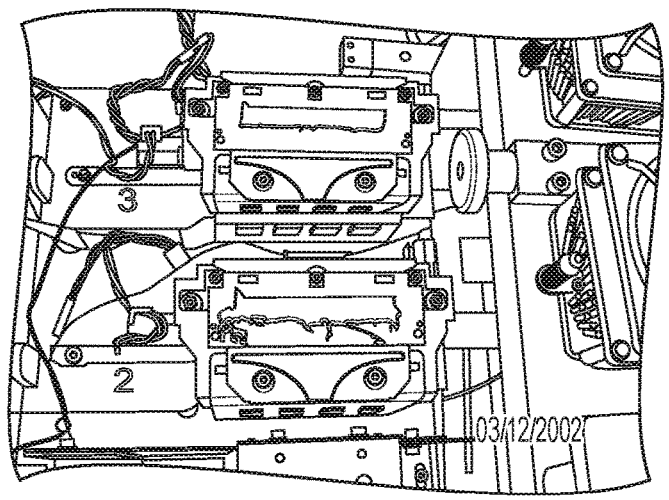
FIG. 1 shows an example of a contaminated front face of a printhead.

Embodiments described here include oleophobic low adhesion surface coatings usable for an ink jet printhead front face, wherein the surface coatings comprise an oleophobic low adhesion polymeric material. When an ink jet printhead front face surface has such a coating, jetted drops of ultra-violet (UV) gel ink, referred to also as "UV ink," or jetted drops of solid ink exhibit low adhesion towards the surface coating. The adhesion of an ink drop towards a surface can be determined by measuring the sliding angle of the ink drop, where the sliding angle is the angle at which a surface is inclined relative to a horizontal position when the ink drop begins to slide over the surface without leaving residue or stain behind. The lower the sliding angle, the lower the adhesion between the ink drop and the surface.

As used here, the term "low adhesion" means a low sliding angle of less than about 30° when measured with ultra-violet curable gel ink or solid ink, with the printhead front face surface as the surface. In some embodiments, a low sliding angle is less than about 25°, in other embodiments the low sliding angle is less than about 20°, when measured with ultra-violet curable gel ink or solid ink with the printhead front face surface as the surface. In yet other embodiments, a low sliding angle is greater than about 1° when measured with ultra-violet curable gel ink or solid ink, with the printhead front face surface as the surface.

As used here, an oleophobic low adhesion surface coating is "thermally stable" when drops of ultra-violet gel ink or solid ink exhibit low adhesion towards the surface coating after the surface coating has been exposed to high temperatures, such as temperatures in a range between 180° C. and 325° C., or in a range between about 200° C. and about 300° C., and high pressures, such as pressures in a range between 100 psi and 400 psi, or in a range between about 120 psi and about 350 psi for extended periods of time. Extended periods of time may lie in the range between 10 minutes and 2 hours, or in a range between about 15 minutes and about 1 hour.

In one embodiment, the surface coating is thermally stable after the surface coating has been exposed to a temperature of or about 290° C. at pressures of or about 350 300 psi for or about 30 minutes. The surface coating also has a long performance life, such as being submerged in 140° C. ink for 2 days in an accelerated life test. The surface coating on a polyimide substrate can be bonded to a stainless steel aperture brace at high temperature and high pressure without any degradation. Therefore the resulting printhead can prevent ink contamination because ink droplets can roll off the printhead front face, leaving behind no residue.

In some embodiments, a printing apparatus includes an ink jet printhead having a front face and an oleophobic low adhesion surface coating disposed on a surface of the front face. The oleophobic low adhesion surface coating includes an oleophobic low adhesion polymeric material configured such that jetted drops of ultra-violet gel ink or jetted drops of solid ink exhibit a contact angle greater than or about 50°. In one embodiment, jetted drops of ultra-violet gel ink or jetted drops of solid ink exhibit a contact angle greater than or about 60°. In another embodiment, jetted drops of ultra-violet gel ink or jetted drops of solid ink exhibit a contact angle greater than or about 65°. In one embodiment, there is no upper limit to the contact angle exhibited between the jetted drops of ultra-violet gel ink or jetted drops of solid ink and the surface coating. In another embodiment, the jetted drops of ultra-violet gel ink or jetted drops of solid ink exhibit a contact angle less than or about 150°.

In yet another embodiment, the jetted drops of ultra-violet gel ink or jetted drops of solid ink exhibit a contact angle less than or about 90°. When ink is filled into the printhead, it is desired to maintain the ink within the nozzle until it is time to eject the ink. Generally, the greater the ink contact angle the better, meaning higher, the drool pressure. Drool pressure relates to the ability of the aperture plate to avoid ink weeping out of the nozzle opening when the pressure of the ink tank or the reservoir increases. Maintaining a higher pressure without weeping allows for faster printing when a print command is given.

In some embodiments, the coatings are thermally stable and provide this property even after exposure to high temperatures, such as temperatures in a range between 180° C. and 325° C., or in a range between about 200° C. and about 300° C., and high pressures, such as pressures in a range between 100 psi and 400 psi, for extended periods of time, between 10 minutes and 2 hours. This maintains high drool pressures.

In one embodiment, the coatings are thermally stable and provide this property even after exposure to a temperature of or about 290° C. at pressures of or about 350 psi for or about 30 minutes, allowing maintenance of high drool pressures. Advantageously, the oleophobic low adhesion surface coatings described herein provide, in combination, low adhesion and high contact angle for ultra-violet curable gel ink and solid ink, which further provides the benefit of improved drool pressure or reduced or eliminated weeping of ink out of the nozzle.

In some embodiments, the oleophobic low adhesion surface coating is a reaction product of a reactant mixture that includes at least one isocyanate and a functionalized fluorocrosslinking material.

Suitable isocyanates include monomeric, oligomeric, and polymeric isocyanates, including, but not limited to, those of the general formula $R_1$—$(NCO)_n$ wherein $R_1$ is an alkyl group, an alkylene group, an aryl group, an arylene group, an arylalkyl group, an arylalkylene group, an alkylaryl group or an alkylarylene group.

In one embodiment, $R_1$ is an alkyl or an alkylene group (including linear and branched, saturated and unsaturated, cyclic and acyclic, and substituted and unsubstituted alkyl and alkylene groups, and wherein heteroatoms, such as oxygen, nitrogen, sulfur, silicon, phosphorus, or the like either may or may not be present in the alkyl or alkylene group). In one embodiment, the alkyl or alkylene group has at least about 8 carbon atoms. In another embodiment, the alkyl or alkylene group has at least about 10 carbon atoms. In another embodiment, the alkyl or alkylene group has at least about 12 carbon atoms. In one embodiment, the alkyl or alkylene group has no more than about 60 carbon atoms. In another embodiment, the alkyl or alkylene group has no more than about 50 carbon atoms. In yet another embodiment, the alkyl or alkylene group has no more than about 40 carbon atoms. It will be appreciated, however, that the number of carbon atoms can be outside of these ranges.

In one embodiment, $R_1$ is an aryl or an arylene group (including substituted and unsubstituted aryl and arylene groups, and wherein heteroatoms, such as oxygen, nitrogen, sulfur, silicon, phosphorus, or the like either may or may not be present in the aryl or arylene group). In one embodiment, the aryl or arylene group has at least about 5 carbon atoms. In another embodiment, the aryl or arylene group has at least about 6 carbon atoms. In one embodiment, the aryl or arylene group has no more than about 50 carbon atoms. In another embodiment, the aryl or arylene group has no more than about 25 carbon atoms. In yet another embodiment, the aryl or arylene group has no more than about 12 carbon atoms. It will be appreciated, however, that the number of carbon atoms can be outside of these ranges.

In one embodiment, $R_1$ is an arylalkyl or an arylalkylene group (including substituted and unsubstituted arylalkyl and arylalkylene groups, wherein the alkyl portion of the arylalkyl or arylalkylene group can be linear or branched, saturated or unsaturated, cyclic or acyclic, and substituted or unsubstituted, and wherein heteroatoms, such as oxygen, nitrogen, sulfur, silicon, phosphorus, or the like either may or may not be present in either the aryl or the alkyl portion of the arylalkyl or arylalkylene group). In one embodiment, the arylalkyl or arylalkylene group has at least about 6 carbon atoms. In another embodiment, the arylalkyl or arylalkylene group has at least about 7 carbon atoms. In one embodiment, the arylalkyl or arylalkylene group has no more than about 60 carbon atoms. In another embodiment, the arylalkyl or arylalkylene group has no more than about 40 carbon atoms. In yet another embodiment, the arylalkyl or arylalkylene group has no more than about 30 carbon atoms. It will be appreciated, however, that the number of carbon atoms can be outside of these ranges.

The substituents on the substituted alkyl, alkylene, aryl, arylene, arylalkyl, arylalkylene, alkylaryl, and alkylarylene groups can be (but are not limited to) halogen atoms, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, mixtures thereof, or the like, wherein two or more substituents can be joined together to form a ring, and n is an integer representing the number of isocyanate groups, being, for example, 1, 2, 3, or the like in the instance of monomeric isocyanates and having no necessary upper limit in the case of polymeric isocyanates.

Examples of diisocyanates include isophorone diisocyanate (IPDI), of the formula

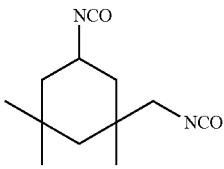

2,4-toluene diisocyanate (TDI); diphenylmethane-4,4'-diisocyanate (MDI); hydrogenated diphenylmethane-4,4'-diisocyanate (H12MDI); tetra-methyl xylene diisocyanate (TMXDI); hexamethylene-1,6-diisocyanate (HDI), of the formula:

OCN—(CH$_2$)$_6$—NCO naphthalene-1,5-diisocyanate; 3,3'-dimethoxy-4,4'-biphenyldiisocyanate; 3,3'-dimethyl-4,4'-bimethyl-4,4'-biphenyldiisocyanate; phenylene diisocyanate; 4,4'-biphenyldiisocyanate; 2,2,4-trimethylhexamethylene diisocyanate and 2,4,4-trimethylhexamethylene diisocyanate, of the formulae:

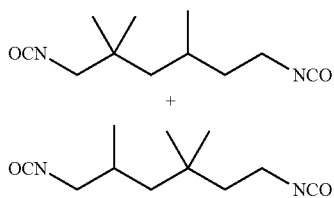

tetramethylene xylene diisocyanate; 4,4'-methylenebis(2,6-diethylphenyl isocyanate); 1,12-diisocyanatododecane; 1,5-diisocyanato-2-methylpentane; 1,4-diisocyanatobutane; dimer diisocyanamide and cyclohexylene diisocyanate and its isomers; uretidione dimers of HDI; or the like, as well as mixtures thereof. Examples of triisocyanates or their equivalents include triphenyl methane-4,4',4"-triisocynate; Tris(p-isocynatophenyl) thiophosphate; trimethylolpropane trimer of TDI, or the like, isocyanurate trimers of TDI, HDI, IPDI, or the like, and biuret trimers of TDI, HDI, IPDI, or the like, as well as mixtures thereof. Examples of higher isocyanate functionalities include copolymers of TDI/HDI, or the like, and MDI oligomers, as well as mixtures thereof. In some embodiments, the isocynate moiety can be allophanate modified MDI or polymers of allophanate modified MDI. In some embodiments, the isocynate moiety can also be a (per)fluoropolyethereal prepolymer having polyisocyanic functionality as described in prior art (U.S. Pat. No. 4,863,986; U.S. Pat. No. 4,704,420; U.S. Pat. No. 6,071,564), and previously available commercially as Fluorobase-Z. In some embodiments, suitable isocyanates may be obtained under the name Desmodur® Mondur® or Impranil® for example, Desmodur N 3300®, Desmodur N 3790®, available from Bayer Materials Science, or the like or mixtures thereof.

Suitable perfluoropolyether compounds include mono- or di-hydroxyl functionalized monomeric, oligomeric, and polymeric perfluoropolyether compounds. Examples of suitable dihydroxy functionalized perfluoropolyether compounds include (but are not limited to) those of the general formula:

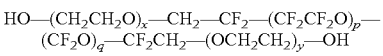

wherein p and q are integers in a range between 0-50, provided that at least one of p and q are not zero, and x and y are integers between 0-10. The highlighted group is an ethyloxide spacer, causing the compound to be more highly reactive than previously used compounds. In one embodiment, a suitable di-functionalized perfluoropolyether compound can be represented by the formula:

In some embodiments, suitable dihydroxy functionalized perfluoropolyether compounds may be obtained under the name Fluorolink®, for example, Fluorolink D®, Fluorolink D108, Fluorolink D10H®, Fluorolink E10®, Fluorolink E10H®, available from Solvay Solexis, or the like or mixtures thereof.

Any suitable reaction conditions for making urethane compounds, or the like, or mixtures thereof, by condensing one or more of the perfluoropolyether compounds with one or more of the isocyanates can be used to prepare the polymer of the oleophobic low adhesion printhead front face coating. Typically (although not necessarily), the reaction can be carried out at various temperatures (for example, from about 25° C. to about 160° C.) in the presence of an optional reaction catalyst, such as dibutyltin dilaurate, bismuth tris-neodecanoate, cobalt benzoate, lithium acetate, stannous octoate, triethylamine, or the like. Other exemplary catalysts include RC catalysts from Rheine Chemie.

In one embodiment, the reaction conditions can be conducted in an inert atmosphere, such as argon or nitrogen gas or other suitable gases, to prevent oxidizing or yellowing of the reaction products and to prevent undesirable side reactions due to moisture. The reaction can be performed neat (i.e., without a solvent) or can optionally employ any desired or effective solvent. Examples of suitable solvents include xylene, toluene, benzene, chlorobenzene, hexafluorobenzene, nitrobenzene, dichlorobenzene, N-methylpyrrolidinone, dimethyl formamide, dimethyl sulfoxide, sulfolane, hexane, tetrahydrofuran, butyl acetate, amyl acetate, HFE 7200 (3M), HFE 7500 (3M), Solvosol (Dow) and the like, as well as mixtures thereof. Another example of a solvent that may be used is FCL 52 solvent, a fluorinated solvent available from Cytonix LLC.

The oleophobic low adhesion surface coating disclosed herein can be employed as an anti-wetting printhead front face coating for an inkjet printhead configured to eject ink onto a recording substrate. Any suitable recording substrate may be employed, including plain papers such as XEROX® 4024 papers, XEROX® Image Series papers, Courtland 4024 DP paper, ruled notebook paper, bond paper, silica coated papers such as Sharp Company silica coated paper, JuJo paper, Hammermill Laserprint Paper, and the like, transparency materials, fabrics, textile products, plastics, polymeric films, inorganic substrates such as metals and wood, and the like.

In embodiments described herein, the oleophobic low adhesion coatings are thermally stable, thereby providing a low sliding angle in a range between or about 1° and 30° or about 30°, and a high contact angle in a range between or about 45° and 150° or about 150° even after exposure to high temperatures such as temperatures in a range between or about 180° C. and 325° C. or about 325° C., and high pressures such as pressures in the range of or about 100 psi to or about 400 psi, for extended periods of time in a range of or about 10 minutes to or about 2 hours. In one embodiment, the oleophobic low adhesion coating is thermally stable after being exposed to a temperature of 290° C. at pressures of 300 psi for 30 minutes. The fabrication of high density Piezo printheads requires a high temperature, high pressure adhesive bonding step. Hence, it would be desirable for a frontface coating to withstand these high temperature and high pressure conditions. The stability of the oleophobic low adhesion surface coating described herein at high temperatures and high pressures is compatible with current printhead manufacturing processes.

When coated onto the front face of an inkjet printhead, the oleophobic low adhesion surface coating exhibits a sufficiently low adhesion with respect to the inks that are ejected from the inkjet printhead such that ink droplets remaining on the oleophobic low adhesion coating can slide off the printhead in a simple, self-cleaning manner. Contaminants such as dust, paper particles, etc., which are sometimes found on the front face of inkjet printheads, can be carried away from the inkjet printhead front face by a sliding ink droplet. The oleophobic low adhesion printhead front face coating can provide a self-cleaning, contamination-free inkjet printhead.

As used herein, the oleophobic low adhesion coating can exhibit a "sufficiently low wettability" with respect to inks that are ejected from an inkjet printhead when a contact angle between an ink and the oleophobic low adhesion coating is, in one embodiment, greater than about 45° and in another embodiment greater than about 55°.

The oleophobic low adhesion coating disclosed herein can be employed as an oleophobic low adhesion printhead front face coating for an inkjet printhead of any suitable inkjet printer, such as continuous inkjet printers, thermal drop-on-demand (DOD) inkjet printers, and piezoelectric DOD inkjet printers. As used here, the term "printer" encompasses any apparatus, such as a digital copier, bookmaking machine, facsimile machine, multi-function machine, and the like, which performs a print outputting function for any purpose.

The oleophobic low adhesion coating disclosed herein can be employed as an oleophobic low adhesion printhead front face coating for an inkjet printhead configured to eject any suitable ink such as, aqueous inks, solvent inks, UV-curable inks, dye sublimation inks, solid inks, etc. An exemplary inkjet printhead suitable for use with the oleophobic low adhesion coating disclosed herein is described with respect to FIG. 2.

Figure 2:
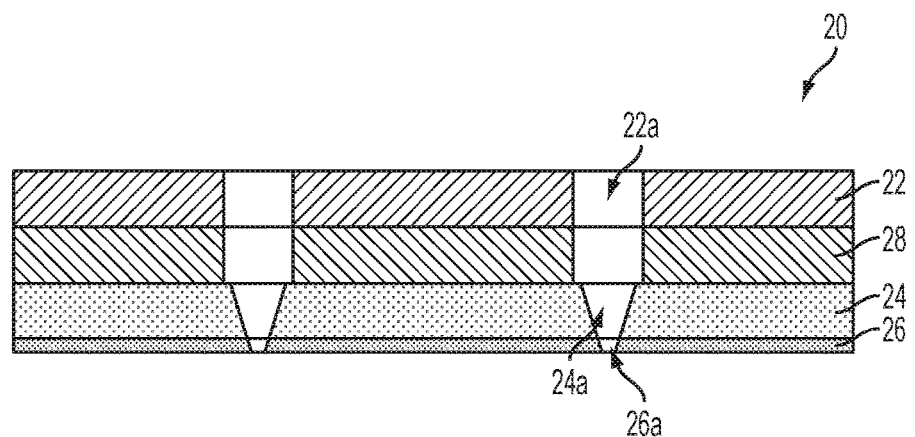
FIG. 2 shows a side view of an embodiment of a jet stack.

A typical inkjet printhead may include a nozzle plate typically bonded to a support brace. FIG. 2 shows an embodiment of a printhead jet stack having an anti-wetting coating. In this embodiment, an oleophobic, low adhesion coating 26 is coated onto a nozzle plate 24. The nozzle plate may be a polymer film, such as a polyimide film, bonded to an aperture support brace 22

The support brace 22 is formed of any suitable material such as stainless steel and include apertures 22a defined therein. The apertures 22a may communicate with an ink source (not shown). The nozzle plate 24 may be formed of any suitable material such as polyimide and include nozzles 24a defined therein. The nozzles 24a may communicate with the ink source via the apertures 22a such that ink from the ink source is jettable from the printhead 20 onto a recording substrate through a nozzle 24a.

In the illustrated embodiment, the nozzle plate 24 is bonded to the support brace 22 by an intervening adhesive material 28. The adhesive material 28 may be provided as a thermoplastic adhesive can be melted during a bonding process to bond the nozzle plate 24 to the support brace 22. Typically, the nozzle plate 24 and the oleophobic low adhesion coating 26 are also heated during the bonding process. Depending on the material from which the thermoplastic adhesive is formed, bonding temperature can be in a range between 180° C. and 325° C. (or in a range between about 180° C. and about 325° C.).

Conventional oleophobic low adhesion coatings tend to degrade when exposed to temperatures encountered during typical bonding processes or other high-temperature, high pressure processes encountered during fabrication of inkjet printheads. However, the oleophobic low adhesion coating 26 disclosed herein exhibits a sufficiently low adhesion (indicated by low sliding angles) and high contact angle with respect to an ink after it has been heated to the bonding temperature. The oleophobic low adhesion coating 26 can provide a self-cleaning, contamination-free inkjet printhead 20 with high drool pressure. The ability of the oleophobic low adhesion coating 26 to resist substantial degradation in desirable surface properties (e.g., including low sliding angle and high contact angle) upon exposure to elevated temperatures enables inkjet printheads having self-cleaning abilities while maintaining high drool pressure, to be fabricated using high-temperature and high pressure processes.

In one embodiment, the oleophobic low adhesion coating 26 may be formed on the substrate 24 by initially applying the reactant mixture that, as described above, includes at least one isocyanate and at least one perfluoropolyether compound. After the reactant mixture is applied to the substrate, in this case the nozzle plate 24, the reactants are reacted together to form the oleophobic low adhesion coating 26. The reactants can be reacted together by, for example, curing the reactant mixture. In one embodiment, the reactant mixture is first cured at a temperature of about 130° C. for about 30 minutes to 2 hours followed by a high temperature post-cure at about 290° C. for about 30 minutes to 2 hours.

In one embodiment, the reactant mixture may be applied to the substrate 24 using any suitable method such as die extrusion coating, dip coating, spray coating, spin coating, flow coating, stamp printing, and blade techniques. An air atomization device such as an air brush or an automated air/liquid spray can be used to spray the reactant mixture. The air atomization device can be mounted on an automated reciprocator that moves in a uniform pattern to cover the surface of the substrate 24 with a uniform or substantially uniform amount of the reactant mixture. The use of a doctor blade is another technique that can be employed to apply the reactant mixture. In flow coating, a programmable dispenser is used to apply the reactant mixture.

Figure 3:
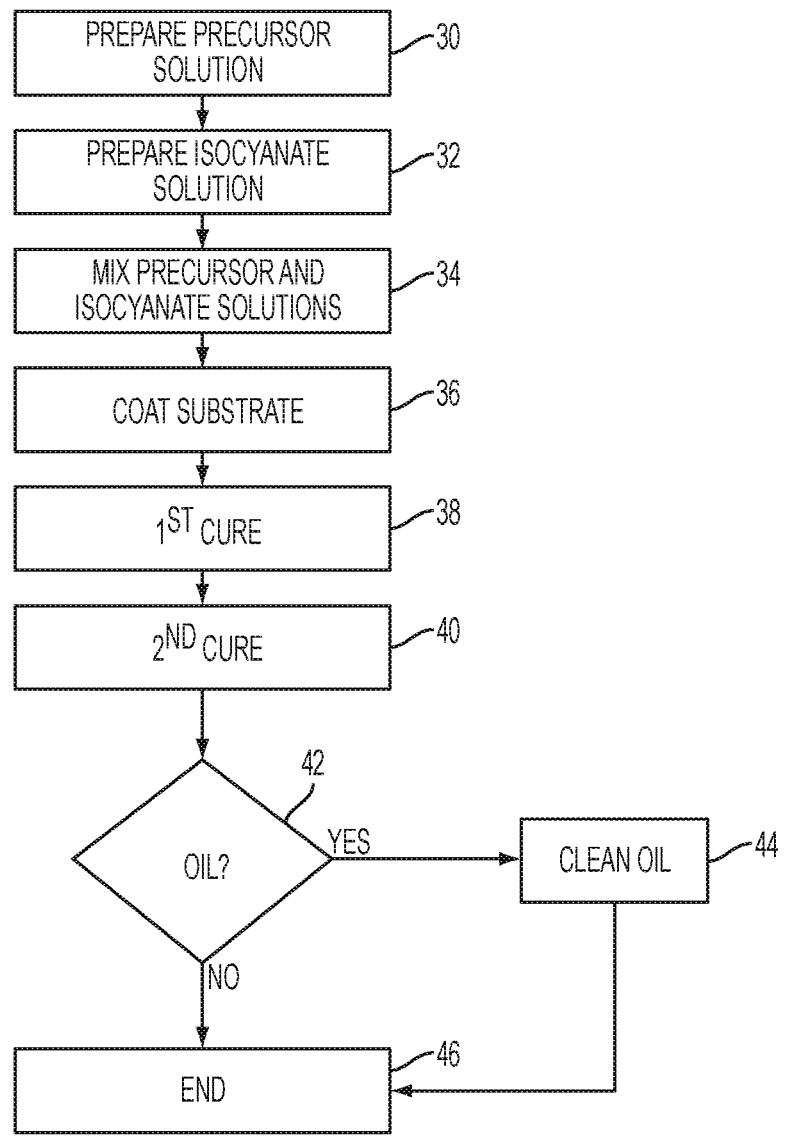
FIG. 3 shows a flowchart of a method of manufacturing an oleophobic, low adhesion coating.

FIG. 3 shows a flow chart of a general process to manufacturing the low adhesion coating. A precursor solution is prepared at 30, a perfluoropolyether diol. The precursor in some of the embodiments here has an ethyloxide spacer that causes the precursor to be more reactive than previous precursors. This generally leads to higher cross-linking in the composite and prevents oil from forming on the surface. However, the process also includes the possibility of using previous precursor, with the presence of oil taken into account later.

At 32, an isocyanate solution is prepared, as will be discussed in detail in the examples below. The isocyanate solution and the precursor are mixed together at 34. In some embodiments the mixing involves different synthesis conditions than in previous embodiments of the low adhesion coating, such as different —OH/—NCO molar ratios and reduced catalyst amounts. The coating is then applied to the surface for which the low adhesion coating is desired, referred to here as a substrate. The coating undergoes a first cure at 38, and a second cure at 40.

As mentioned above, some embodiments may not use the more reactive precursor, and the higher temperature second cure may result in formation of a layer of oil on the surface. The process tests for oil at 42. If oil is present at 42, it is removed with a solvent and a foam brush that will not damage the coating at 44 and the process ends at 46. If no oil is present, as is the case with the more reactive precursor in the example below, the process ends at 46.

Specific embodiments will now be described in detail. These examples are intended to be illustrative, and the claims are not limited to the materials, conditions, or process parameters set forth in these embodiments.

EXAMPLES

Example 1

23.4 grams of Fluorolink-D was added to a 3 neck round bottom flask fitted with an addition funnel, a temperature probe and a condenser. 135 mL of Novec 7200, 95 mL of ethyl acetate and 0.211 grams of dibutyltin dilaurate catalyst were added to the 3 neck round bottom flask, and the contents were stirred and heated to a gentle reflux (~71° C.) under a nitrogen atmosphere. A second solution was prepared by dissolving 5.04 grams of Desmodur 3790 in 185 mL of ethyl acetate and 63 mL of Novec 7200. This isocyanate solution was then transferred to the addition funnel connected to the round bottom flask, and was added dropwise to the Fluorolink solution over a 2-hour period at 71° C. The resulting mixture was then stirred at 71° C. overnight. It was then cooled to room temperature and was filtered using a Millipore Opticap XL filter (pore size 0.2 microns) to yield the product solution. The solid concentration of the product solution was ~4-5%.

The product solution was diluted to ~3% solid by adding Novec 7200. The diluted solution was transferred to a round bottom flask and it was concentrated to ~12% solid concentration by distillation using a vigreaux distillation apparatus. The concentrated solution after cooling to room temperature was coated onto a polyimide substrate using a drawbar coater. The coated film was air dried for 5 minutes and then heat-cured in an oven using two sequential curing steps as follows: the air dried film was placed in oven at 150° C. for 30 minutes ($1^{st}$ cure) and then at 260° C. for 30 minutes ($2^{nd}$ cure) to produce the antiwetting coating. A series of coatings with different $1^{st}$ cure and $2^{nd}$ cure conditions were generated as described to yield coatings 1-5. In another case, the $1^{st}$ cure and 2" cure step were combined into a single profiled ramp curing step to yield coating 6. Coatings were evaluated for film quality and surface properties towards inks as described next.

Contact angle and sliding angle of the coatings were determined on an OCA20 goniometer from Dataphysics. In a typical static contact angle measurement, about 10 microliter of solid ink or UV ink (at typical ink jetting temperature of 115° C. or 90° C. respectively) was gently deposited on the surface of the coating and the static angle was determined by the computer software (SCA20). Each reported data is an average of >5 independent measurements. Sliding angle measurement was done by tilting the base unit at a rate of 1°/sec with an about 10 microliter droplet of solid ink or UV ink. The sliding angle is defined as the inclination angle at which the test drops began to slide.

An offline test, so called stacking, was used to simulate adhesive bonding during printhead fabrication. Typically the coating was subjected to a high pressure and high temperature stress, e.g., at 290° C. at 350 psi for 30 min and the contact angle and sliding angle afterward were measured.

Ink aging experiment was designed as an accelerated test to simulate the functional life of the coating. The experiment was performed by immersing the coating after stacking in a molten solid ink (equal parts of cyan, magenta, yellow and black ink) at 140° C. for 2 days, or molten cyan UV ink at 90° C. for 2 days. The contact angle and sliding angle after ink aging were determined as described before.

The quality of the coating surface was inspected for the presence of trace amount of oil by gently rubbing the surface with a Q-tip and visually observing for smudge marks. The presence of smudge marks indicates the presence of oil on the coating surface.

The results for coatings 1-6 are summarized in Table 1 and all of them show smudge marks after the Q-tip test. Their surface properties were good as indicated by the high ink contact angles, low ink sliding angles and absence of any residue on the test surface after ink sliding.

TABLE 1

| Coating | 1st Cure | 2nd Cure | Film Quality | Surface Property Solid Ink Contact angle (slide angle) | | | Surface Property UV Ink Contact angle (slide angle) | | |
|---|---|---|---|---|---|---|---|---|---|
| | | | | Cured | Stacked | Inked | Cured | Stacked | Inked |
| 1 | 150° C. 30 min | 260° C. 30 min | Trace oil | 73° (1°) | 74° (1°) | 63° (17°) | 63° (17°) | 67° (21°) | 71° (23°) |
| 2 | 150° C. 30 min | 290° C. 30 min | Trace oil | 71° (2°) | 72° (3°) | 60° (19°) | | | |
| 3 | 150° C. 30 min | 275° C. 30 min | Trace oil | 75° (7°) | 73° (5°) | 67° (16°) | | | |
| 4 | 150° C. 30 min | 250° C. 30 min | Trace oil | 73° (6°) | 71° (5°) | 57° (21°) | | | |
| 5 | 130° C. 60 min | 260° C. 30 min | Trace oil | 70° (6°) | 74° (3°) | 60° (19°) | | | |
| 6 | Ramp RT to 150° C. + 30 min followed by ramp to 260° C. + 30 min | | Trace oil | 74° (1°) | 74° (2°) | 65° (9°) | 69° (13°) | 71° (19°) | 71° (17°) |

Cured:- Coating after final heat curing step
Stacked:- Cured coating subjected to 350 psi/290° C. for 30 min
Inked:- Cured and stacked coating subjected to CYMK solid ink or cyan UV exposure for 2 days

Example 2

Coatings 6 of Example 1 was subjected to a wipe cleaning step as follows: a 2 inch wide foam brush (from Lowes) was soaked in Novec 7200 and was brushed across the surface of the coating in a single smooth painting like stroke. It was allowed to air dry for 5 minutes. This resulted in coating 7 and the properties are given in Table 2. The surface of this coating displayed no visible oil and it exhibits good surface properties. However such a cleaning step increases the cost and complexity of coating manufacturing.

TABLE 2

| Coating | Film Quality | Surface Property with Solid Ink Contact angle (slide angle) | | | Surface Property with UV Ink Contact angle (slide angle) | | |
|---|---|---|---|---|---|---|---|
| | | Cured | Stacked | Inked | Cured | Stacked | Inked |
| 7 | No oil | 74° (8°) | 67° (4°) | 62° (17°) | | 76° (24°) | 69° (28°) |

Example 3

38.3 grams of Fluorolink-E10H was added to a 3 neck round bottom flask fitted with an addition funnel, a temperature probe and a condenser. 245 mL of Novec 7200, 170 mL of ethyl acetate and 0.333 grams of dibutyltin dilaurate catalyst were added to the 3 neck round bottom flask, and the contents were stirred and heated to a gentle reflux (~71° C.) under a nitrogen atmosphere. A second solution was prepared by dissolving 11.6 grams of Desmodur 3790 in 445 mL of ethyl acetate and 145 mL of Novec 7200. This isocyanate solution was then transferred to the addition funnel connected to the round bottom flask, and was added dropwise to the Fluorolink solution over a 2-hour period at 71° C. The resulting reactant mixture was stirred overnight. After cooling to room temperature, the product solution was filtered and distilled according to the procedure described in Example 1, yielding a coating solution with a solid concentration of ~10%. Several coated films were made on polyimide substrate using the coating and heating curing procedures described in Example 1. The properties of these films, coating 8-17 were evaluated again using the procedures provided in Example 1 and the results are given in Table 3.

TABLE 3

| Coating | 1st Cure | 2nd Cure | Film Quality | Surface Property Solid Ink Contact angle (slide angle) | | | Surface Property UV Ink Contact angle (slide angle) | | |
|---|---|---|---|---|---|---|---|---|---|
| | | | | Cured | Stacked | Inked | Cured | Stacked | Inked |
| 8 | 130° C. 30 min | 290° C. 30 min | No oil | 75° (3°) | 72° (4°) | 57° (23°) | 67° (33°) | 64° (21°) | 67° (24°) |
| 9 | 130° C. 60 min | 290° C. 30 min | No oil | 73° (5°) | 68° (13°) | 56° (29°) | | | |
| 10 | 145° C. 30 min | 260° C. 30 min | No oil | 73° (8°) | 60° (16°) | | | | |
| 11 | 145° C. 60 min | 290° C. 30 min | No oil | 66° (13°) | 65° (11°) | 52° (26°) | | | |
| 12 | 145° C. 60 min | 290° C. 60 min | No oil | 73° (3°) | 69° (8°) | 55° (22°) | | | |
| 13 | 145° C. 60 min | 275° C. 30 min | No oil | 70° (9°) | 63° (11°) | 51° (23°) | | | |
| 14 | 145° C. 60 min | 275° C. 60 min | No oil | 73° (2°) | 71° (3°) | 58° (20°) | | | |
| 15 | 145° C. 60 min | 260° C. 30 min | No oil | 72° (6°) | 61° (21°) | 55° (20°) | | | |
| 16 | 145° C. 60 min | 260° C. 60 min | No oil | 71° (2°) | 67° (6°) | 59° (21°) | | | |
| 17 | Ramp RT to 130° C. + 30 min followed by ramp to 290° C. + 30 min | | No oil | 71° (5°) | 69° (9°) | 56° (25°) | | | |

Cured:- Coating after final heat curing step
Stacked:- Cured coating subjected to 350 psi/290° C. for 30 min
Inked:- Cured and stacked coating subjected to CYMK solid ink or cyan UV exposure for 2 days Coatings 8-17 displayed no visible oil by the Q-tip test and the surface properties were good as indicated by the high ink contact angles, low ink sliding angles and absence of any residue on test surface after ink sliding. Coatings 8-17 are advantageous as compared to coating 7 from the cost and manufacturing viewpoint as no solvent wiping step is needed to remove the oil after curing.

Example 4

The coating solution obtained in Example 3 was coated on to a polyimide substrate using an extrusion die. The coated film was air dried for 5 min and was cured with an infrared heater lamp instead of an oven. This results in coating 18 and the surface property data is given in Table 4.

TABLE 4

| Coating | 1st Cure | 2nd Cure | Film Quality | Surface Property for Solid Ink Contact angle (Slide angle) | | |
|---|---|---|---|---|---|---|
| | | | | Cured | Stacked | Inked |
| 18 | 130° C. 30 min | 290° C. 30 min | No oil | 73° (7°) | 68° (20°) | 58° (29°) |

Example 5

The reaction product solution synthesized in Example 3 was diluted to ~3.5% solid concentration by adding Novec 7200 solvent. The diluted solution was distilled to ~18% solid concentration as described in Example 1. This coating solution was coated onto a polyimide substrate using a drawbar coater. The coated film was air dried for 5 minutes and heat-cured using the procedures described in Example 1, resulting in coating 19. The result is given in Table 5.

TABLE 5

| Coating | 1st Cure | 2nd Cure | Film Quality | Surface Property for Solid Ink Contact angle (Slide angle) | | |
|---|---|---|---|---|---|---|
| | | | | Cured | Stacked | Inked |
| 19 | 130° C. 30 min | 290° C. 30 min | No oil | 75° (5°) | 69° (13°) | 61° (31°) |

The coating obtained in the above examples retain good surface properties, high contact angle and low sliding angle, after stacking at 290° C. and 350 psi for 30 minutes, and inking in molten ink for 2 days at 140° C. These coatings show no oil on the surface after the final curing while maintaining good surface properties. These coatings have no issues related to shelf life and handling. The coatings have also successfully been scaled up on a flow coater demonstrating manufacturability. This reduces the overall manufacturing costs of the print heads using these coatings.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A process of forming an oleophobic low adhesion coating for an ink jet printhead front face, comprising:
    mixing a reactant mixture comprising a first isocyanate compound and a hydroxyl functionalized fluoro-crosslinking material having an ethyloxide spacer while heated to 71° C.;
    coating a reactant mixture comprising a first isocyanate compound and a hydroxyl functionalized fluoro-crosslinking material having an ethyloxide spacer having the general formula of:

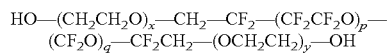

wherein p and q are integers in a range between 0-50, provided that at least one of p and q are not zero, and x and y are integers between 0-10, onto a substrate, wherein the reactant mixture is coated from a mixture of at least one fluoroalkyl ether solvent and ethyl acetate;
    subjecting the coated reactant mixture to a first curing treatment at a temperature of about 150° C. for a period of time of about 30 minutes; and
    thereafter, subjecting the coated reactant mixture to a second curing treatment at a temperature of about 260° C. for a period of time of about 30 minutes.

2. The process of claim 1, wherein the first curing treatment and the second curing treatment are combined into a single ramping step by heating from room temperature to a temperature in range between 130° to 150° C. at a heating rate between 1° to 10° C. per min and holding at that temperature for 30 to 120 min, followed by heating to a temperature in range between 250° to 300° C. at a heating rate between 1° to 10° C. per min and holding at that temperature for 30 to 60 min.

3. The process of claim 1, wherein the fluoroalkyl ether solvent is selected from group consisting of ethyl nonafluoroisobutyl ether, ethyl nonafluorobutyl ether, pentane 1,1,1,2,2,3,4,5,5,5 decafluoro-3-methoxy-4-(trifluoromethyl), 3-ethoxy-1,1,1,2,3,4,4,5,5,6,6,6-dodecafluoro-2-trifluoromethyl-hexane, 1,1,1,2,3,3-hexafluoro-4-(1,1,2,3,3,3-hexafluoropropoxy)-pentane.

4. The process of claim 1, wherein the mixing is performed for a time period ranging from 1 to 24 hours.

5. The process of claim 1, wherein the mixing comprises:
    dissolving the hydroxyl functionalized perfluoropolyoxyalkane in a mixture of at least one fluoroalkyl ether solvent and ethyl acetate;
    adding a catalyst to produce perfluoropolyoxyalkane solution; and
    heating the perfluoropolyoxyalkane solution, before mixing the perfluoropolyether solution with the isocyanate.

6. The process of claim 1, wherein the mixing comprises:
    dissolving the isocyanate in a mixture of at least one fluoroalkyl ether solvent and at least ethyl acetate;
    adding the isocyanate to the heated dihydroxyl perfluoropolyoxyalkane solution over a period of time between 30 minutes to 4 hours.

* * * * *